Aug. 24, 1937.　　　W. Z. MOSS　　　2,091,101
TIRE DEFLATION INDICATOR
Filed Feb. 5, 1935
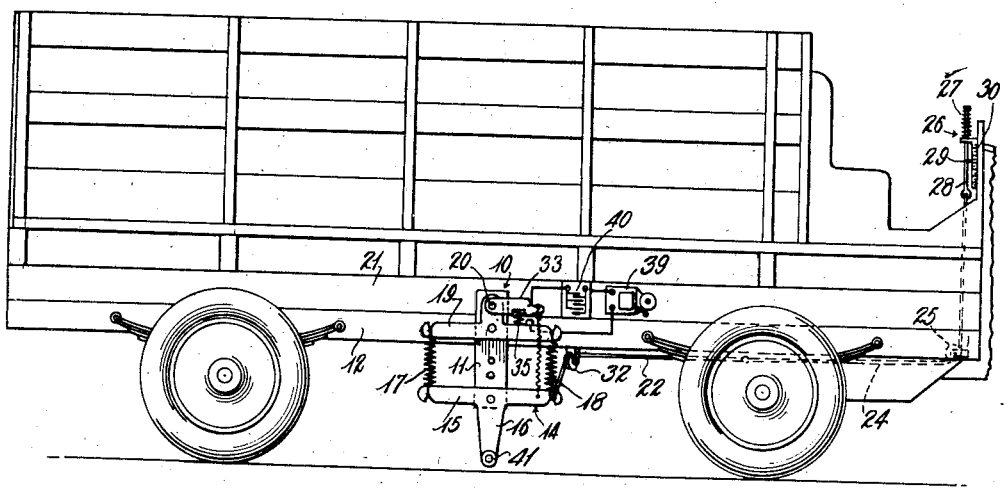
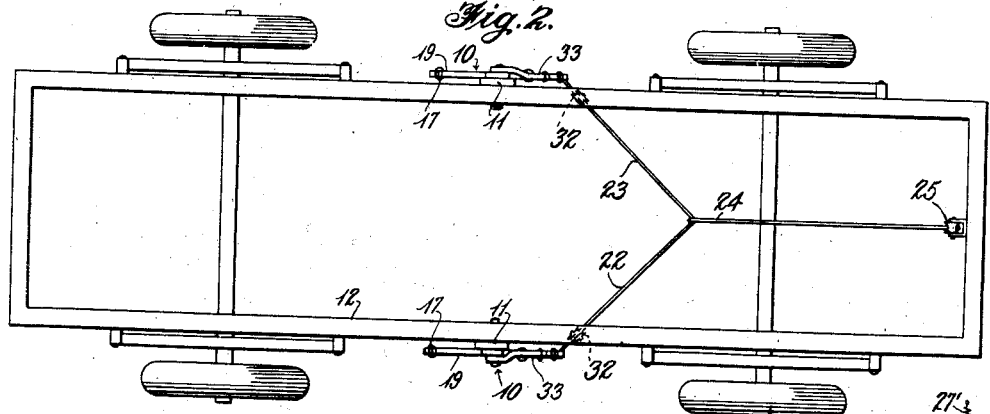
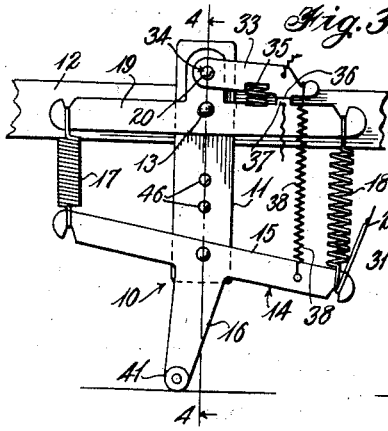
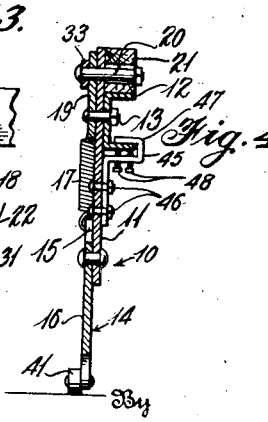
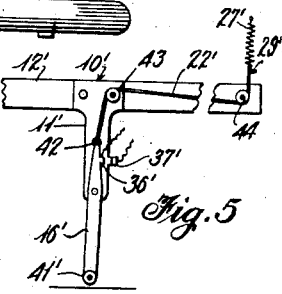
Inventor
William Z. Moss
Brown & Phelps
Attorneys

UNITED STATES PATENT OFFICE 2,091,101

TIRE DEFLATION INDICATOR

William Z. Moss, Lakeview, Oreg.

Application February 5, 1935, Serial No. 5,109

2 Claims. (Cl. 177—311)

The invention relates to deflation indicators for pneumatic tires and has as an object a device that will indicate by either visual or audible signals when a tire becomes deflated either partially or totally.

It is a further object of the invention to provide a device which may be utilized either upon a motor driven vehicle or a trailer driven thereby for the purpose referred to.

It is a further object of the invention to provide a device of the character referred to which will be simple and cheap to manufacture, as well as effective in use.

Further objects of the invention will appear from the following description when read in connection with the accompanying drawing showing illustrative embodiments of the invention, and wherein:—

Figure 1 is a side view of the device applied to a vehicle;

Fig. 2 is a plan view of a vehicle frame with the body omitted, showing the device applied thereto;

Fig. 3 is a detail side elevation of the device in indicating position;

Fig. 4 is a vertical section on line 4—4 of Fig. 3; and

Fig. 5 is a side view of a different form of the invention.

It is sometimes difficult to detect a flat tire, particularly on the rear wheels of a vehicle and in the case of a trailer there is no indication to the driver of the vehicle hauling the trailer when a tire becomes deflated except sound of the rim bumping upon the pavement, which sound is usually drowned by noise of the vehicle itself.

The present invention is applicable to a trailer and has provisions of means for indicating such deflation, which means may be mounted upon the dash of the vehicle to which the trailer may be attached.

The invention as shown in Figures 1 and 2 is applied to a four-wheel vehicle, which may be a motor vehicle or a trailer, but it is obvious that the device may be applied in the same manner to a two-wheel trailer. Preferably one of the devices, as 10, is applied to each side of the vehicle upon which a flat tire is to be indicated. As shown, the device comprises a vertical plate 11 which may be attached to the sill 12 of the chassis, as by means of a rivet 13. Upon the lower end of the plate 11 there is shown pivoted a T-shaped plate 14 having a horizontal member 15 and a vertical member 16, which latter member, as shown in Figure 1, is positioned to clear the ground or pavement when the tires are fully inflated.

To keep the vertical member 16 in vertical position, the ends of the member 15 are shown as connected by means of tension springs 17, 18 to the ends of a second horizontal member 19, which latter member may be secured to the plate 11 and the sill 12 by the rivet 13, and also by means of a rivet 20 passing through the chassis member 21 as shown in Figure 4. The two rivets 13 and 20 will prevent rotation of the member 19.

To indicate the contact of the end of member 16 with the ground which will swing the member 14 to the position shown in Figure 3 as the vehicle moves, there are shown cables 22, 23 each secured at a point midway of the width of the vehicle to a cable 24, which may be connected about pulley 25 and attached to an indicating device 26, Figure 1, the cable 24 being kept taut by means of a tension spring 27 upon the dash of the vehicle.

The indicating device is shown as comprising the said spring 27, a sliding rod 28 to which the spring 27 is connected and a pointer 29 moving over a scale 30 whereby pull upon the cable 24 caused by deflection of the member 14 by contact with the ground will immediately be shown upon the scale 30.

Instead of the visual signal described, an audible signal may be actuated by means of an arm pivoted upon rivet 20 at 34 and held in normal position by spring 35 acting in compression to hold contacts 36, 37 separated as shown in Figure 1. An end of the arm 33 is shown as connected to member 15 by means of a tension spring 38, which when tensed by movement of the member 15 overcomes compression spring 35 to bring the contacts together and to close the circuit through an audible signal, as a bell 39.

The bell 39 may be placed as shown in Figure 1 adjacent the device 10 or at any other place upon the vehicle, either the trailer or the motor vehicle, as will be obvious, and a battery 40 may be the battery provided for ignition and lighting the vehicle.

In the form of the invention illustrated in Figure 5, the actuating member 16' is shown as a single straight bar pivoted between its ends upon the member 11' which in turn is shown as rigidly secured to the sill 12. The member 16' is shown as provided with an eye 42 above its pivot to which the cable 22' may be secured to be passed about pulleys 43 and 44 and secured to spring 27'. It will be seen that movement of member 16' in either direction about its pivot will cause movement of indicator 29' and that the spring 27' will act to hold the member 16' in normal position when out of contact with the pavement. Contacts 36' and 37' may be applied to this form of the device. In case the audible signal only is desired for use with this form of the device, the spring 27' may be transferred to the member 11' with one end secured directly to eye 42 and the upper end anchored upon member 11'.

The device 10 may be so placed as to be actuated only when a tire is substantially flat, or it may be so placed to have the member 16 contact the ground so as to actuate a signal as soon as a tire becomes too "soft". Obviously both forms of signal may be utilized at the same time. Desirably the end of the member 16 is provided with a roller 41 for an obvious purpose, although such provision is not essential.

Minor changes may be made in the physical embodiments of the invention without departing from the spirit thereof within the scope of the appended claims.

I claim:

1. A device of the class described comprising, in combination: a support to be secured to the frame of a pneumatic tired vehicle; a T-member pivoted upon said support with a leg normally positioned out of contact with the pavement; tension springs connected to the head of said member upon opposite sides of said pivot, the opposite ends of said springs anchored upon said support whereby to hold the first named leg in central position; a cable connected to one branch of said head and passing to an indicating device adjacent a driver's position; spring means to hold said cable taut; and indicating means to show the amount of yielding of said last named spring means upon movement of said device caused by contact with the pavement.

2. A device of the class described comprising, in combination: a support to be rigidly secured to the frame of a pneumatic tired vehicle, comprising a plate to extend downwardly from said frame and a transverse member secured adjacent its central portion to said plate near its upper end; a T-member pivoted at the central portion of its head to the lower portion of said plate with the arms of said head normally parallel with said transverse member; the effective combined length of said plate extension and the vertical leg of said T-member being such as to space the lower end of the latter from the pavement less than the cross-sectional diameter of an inflated tire of the vehicle; balanced tension springs anchored to the opposite ends of said transverse and T members; fixed and movable electrical contacts carried by said support; a spring holding said contacts normally open; and a spring of greater stiffness than the last named spring anchored to the movable contact and to an arm of said T-member to close said contacts when the leg of said T-member contacts with the ground while the vehicle is in motion.

WILLIAM Z. MOSS.